(12) United States Patent
Richardson

(10) Patent No.: US 9,452,841 B2
(45) Date of Patent: Sep. 27, 2016

(54) SYSTEM AND METHOD FOR COOLING AN AIRCRAFT WING

(75) Inventor: John Richardson, Belfast (GB)

(73) Assignee: SHORT BROTHERS PLC, Belfast (GB)

( * ) Notice: Subject to any disclaimer, the term of this patent is extended or adjusted under 35 U.S.C. 154(b) by 82 days.

(21) Appl. No.: 14/360,925

(22) PCT Filed: Nov. 29, 2011

(86) PCT No.: PCT/EP2011/071318
§ 371 (c)(1),
(2), (4) Date: May 27, 2014

(87) PCT Pub. No.: WO2013/079100
PCT Pub. Date: Jun. 6, 2013

(65) Prior Publication Data
US 2014/0339357 A1    Nov. 20, 2014

(51) Int. Cl.
*B64D 29/02* (2006.01)
*B64D 15/04* (2006.01)
*B64D 13/00* (2006.01)
*B64C 7/02* (2006.01)
*B64D 33/02* (2006.01)

(52) U.S. Cl.
CPC ............ *B64D 13/006* (2013.01); *B64C 7/02* (2013.01); *B64D 15/04* (2013.01); *B64D 29/02* (2013.01); *B64D 2033/0233* (2013.01)

(58) Field of Classification Search
CPC ............ B64D 13/006; B64D 13/08; B64D 2013/0607; B64D 2013/0618; B64D 15/04; B64D 27/26; B64D 27/18; B64C 27/02; B64C 21/02; B64C 23/06; F02K 1/38; F02C 9/18
See application file for complete search history.

(56) References Cited

U.S. PATENT DOCUMENTS

| | | | | |
|---|---|---|---|---|
| 2,448,826 A | * | 9/1948 | Reaser | B64D 13/08 237/1 SL |
| 2,477,525 A | * | 7/1949 | Paget | B64D 13/08 454/73 |
| 2,575,541 A | * | 11/1951 | Williamson, Jr. | B64D 13/08 244/117 R |

(Continued)

FOREIGN PATENT DOCUMENTS

| | | |
|---|---|---|
| CN | 101272951 A | 9/2008 |
| CN | 101932509 A | 12/2010 |

(Continued)

OTHER PUBLICATIONS

International Search Report mailed Aug. 21, 2012, for International Patent Application No. PCT/EP2011/071318.

(Continued)

*Primary Examiner* — Joseph W Sanderson
(74) *Attorney, Agent, or Firm* — Thomas & Karceski, PC

(57) ABSTRACT

An aircraft comprises a turbine engine suspended from a wing by means of a pylon. Compressed hot air is bled off from the turbine engine. A bleed air duct in the wing conveys the compressed hot air towards a fuselage. In order to prevent overheating of aircraft parts that are relatively close to the bleed air duct, the following solution is proposed. The pylon comprises an opening with a covering structure projecting into a bypass exhaust flow from the turbine engine. The covering structure leaves a slit facing away from the bypass exhaust flow. An airflow path extends from openings in the wing to the slit left by the covering structure.

20 Claims, 3 Drawing Sheets

(56) References Cited

U.S. PATENT DOCUMENTS

| | | | |
|---|---|---|---|
| 3,658,279 A * | 4/1972 | Robertson | B64C 23/005 244/207 |
| 3,920,203 A * | 11/1975 | Moorehead | B64C 21/04 244/110 B |
| 4,466,587 A * | 8/1984 | Dusa | B64C 7/02 244/1 N |
| 4,482,114 A | 11/1984 | Gupta et al. | |
| 5,114,103 A | 5/1992 | Coffinberry | |
| 5,125,597 A | 6/1992 | Coffinberry | |
| 5,143,329 A | 9/1992 | Coffinberry | |
| 5,263,667 A * | 11/1993 | Horstman | B64C 21/06 244/130 |
| 5,348,256 A * | 9/1994 | Parikh | B64C 21/06 244/204 |
| 5,729,969 A | 3/1998 | Porte | |
| 5,772,156 A * | 6/1998 | Parikh | B64C 21/025 244/130 |
| 5,779,196 A * | 7/1998 | Timar | B64C 21/06 244/130 |
| 5,899,416 A * | 5/1999 | Meister | B64C 21/06 244/207 |
| 6,442,944 B1 | 9/2002 | Skur, III | |
| 6,629,428 B1 | 10/2003 | Murry | |
| 7,802,752 B2 * | 9/2010 | Papamoschou | F02K 1/383 181/220 |
| 7,926,261 B2 | 4/2011 | Porte | |
| 8,245,976 B2 * | 8/2012 | Sakurai | B64C 21/02 244/129.5 |
| 8,342,443 B2 * | 1/2013 | Gatzke | B64D 13/08 244/134 B |
| 8,459,588 B2 * | 6/2013 | Diochon | B64D 15/04 137/561 A |
| 8,661,833 B2 * | 3/2014 | Army | B64D 13/08 137/899.2 |
| 8,857,767 B2 * | 10/2014 | Stolte | B64C 21/04 244/134 B |
| 8,991,749 B2 * | 3/2015 | Dravet | B64C 7/02 244/1 N |
| 9,022,311 B2 * | 5/2015 | Thomas | B64C 7/02 244/1 N |
| 9,062,604 B2 * | 6/2015 | DeFrancesco | B64D 13/08 |
| 2007/0245739 A1 | 10/2007 | Stretton et al. | |
| 2008/0271433 A1 | 11/2008 | Olver | |
| 2010/0181435 A1 * | 7/2010 | Sakurai | B64C 21/02 244/209 |
| 2010/0288890 A1 | 11/2010 | Gatzke | |
| 2011/0108662 A1 * | 5/2011 | Diochon | B64D 15/04 244/54 |
| 2012/0068011 A1 * | 3/2012 | Thomas | B64C 7/02 244/1 N |
| 2012/0180501 A1 * | 7/2012 | Army | B64D 13/08 60/796 |
| 2012/0180509 A1 * | 7/2012 | DeFrancesco | B64D 13/08 62/172 |
| 2012/0180886 A1 * | 7/2012 | Army | B64D 13/08 137/596.14 |
| 2013/0032663 A1 * | 2/2013 | Dravet | B64C 7/02 244/54 |
| 2014/0190162 A1 * | 7/2014 | Fonseca | F01D 15/005 60/605.1 |
| 2015/0247463 A1 * | 9/2015 | DeFrancesco | B64D 13/08 60/782 |

FOREIGN PATENT DOCUMENTS

| | | |
|---|---|---|
| EP | 0459816 A1 | 12/1991 |
| EP | 0459816 B1 | 12/1991 |

OTHER PUBLICATIONS

NACA Technical Report 713, "Internal-Flow Systems for Aircraft," F.M. Rogallo, Jan. 1, 1941, Report No. 713, Langley Aeronautical Laboratory, Langley, VA.

"Review and Experimental Survey of Flapped Exhaust Performance," E. Bernard and J. Richardson, 2008, Journal of Aircraft, vol. 45, pp. 349-352.

Chinese Office Action dated May 4, 2015, for Chinese Patent Application No. 201180075132.5.

Chinese Office Action dated Dec. 17, 2015, for Chinese Patent Application No. 201180075132.5.

Chinese Office Action dated Jun. 1, 2016, for Chinese Patent Application No. 201180075132.5.

* cited by examiner

SYSTEM AND METHOD FOR COOLING AN AIRCRAFT WING

CROSS-REFERENCE TO RELATED APPLICATION(S)

This is a National Stage Entry into the United States Patent and Trademark Office from International PCT Patent Application No. PCT/EP2011/071318, having an international filing date of Nov. 29, 2011, the entire contents of which are incorporated herein by reference.

FIELD OF THE INVENTION

An aspect of the invention relates to an aircraft in which compressed hot air is bled off from a turbine engine. The aircraft may comprise, for example, a wing made of composite materials in which a duct is located through which the compressed hot air flows. Other aspects of the invention relate to a method of operating such an aircraft and a structural assembly for such an aircraft, whereby the structural assembly comprises a pylon by means of which a turbine engine can be suspended from a wing.

BACKGROUND OF THE INVENTION

In an aircraft with a turbine engine, hot compressed air can be bled off from the turbine engine. This bleed air can be used for various functions, such as, for example, deicing of aircraft parts and air conditioning of a cabin, which typically involves heating and pressurizing the cabin. To that end, the aircraft is generally provided with a bleed air duct system. The bleed air duct system conveys the bleed air to aircraft parts that may require deicing, or to a fuselage of which the cabin forms part, or both. The bleed air duct system then traverses a pylon by means of which the turbine engine is suspended from a wing, and traverses the wing itself.

An overheating risk exists in an aircraft that uses air bled off from a turbine engine as described above. This bleed air is relatively hot. The bleed air duct system therefore radiates and convects heat when conveying bleed air. Moreover, in the bleed air duct system, there is a potential of bleed air leaking from joints, valves, and other elements that make up the bleed air duct system. Accordingly, aircraft parts that are relatively close to a bleed air duct run a risk of being heated to a critical temperature where structural strength may be compromised. This risk is particularly important for aircraft parts made of composite materials, which have a relatively low critical temperature.

There are several techniques for reducing the overheating risk identified above. For example, thermal insulation may be applied so as to protect aircraft parts from overheating. Another technique that may be applied is forced ventilation during flight. An overheating detection system may also be applied to prevent overheating. A cooling device may be provided near a point where bleed air is taken from the turbine engine. The cooling device may cool the bleed air before the bleed air is applied to the bleed air duct system so as to reduce the overheating risk.

US patent application published under number US 2010/028890 describes a wing-engine combination that includes an engine bleed air duct, which extends along a leading edge of a main wing. An inlet of the engine bleed air duct is coupled to an engine hot-air space. An outlet of the engine bleed air duct is coupled to a consumer of engine bleed air. An ambient air duct extends along the engine bleed air duct. Ambient air is let into in the ambient air duct. The engine bleed air duct and the ambient air duct form a heat exchanger for cooling engine bleed air flowing in the engine bleed air duct.

SUMMARY OF THE INVENTION

There is a need for a practical solution that, in a wide variety of conditions, reduces the overheating risk in an aircraft that uses air bled off from a turbine engine.

In order to better address this need, and in accordance with an aspect of the invention, an aircraft is provided comprising:
   a turbine engine provided with a bypass duct, which surrounds an engine core, the bypass duct outputting a bypass exhaust flow when the turbine engine is in operation;
   a bleed off-take arrangement for bleeding off compressed hot air from the turbine engine;
   a wing comprising a bleed air duct for conveying compressed hot air that has been bled off from the turbine engine towards a fuselage; and
   a pylon by means of which the turbine engine is suspended from the wing, the pylon comprising an opening with a covering structure projecting into the bypass exhaust flow and leaving a slit facing away from the bypass exhaust flow, the pylon and the wing being arranged so that an airflow path extends from openings in the wing to the slit left by the covering structure.

In such an aircraft, the bypass exhaust flow of the turbine engine flows externally along the covering structure on the opening in the pylon. This generates a reduced pressure in the vicinity of the slit left by the covering structure. The reduced pressure in the vicinity of the slit creates a suction effect, which draws air outwards from the pylon. As a result, a ventilating airflow occurs in the airflow path that extends from the openings in the wing to the slit. The ventilating airflow can provide a significant cooling effect for aircraft parts that are relatively close to the bleed air duct. This considerably reduces the overheating risk.

Importantly, the aforementioned also applies when the aircraft is static on the ground with the turbine engine operating because, for example, the aircraft is queuing for takeoff. The risk of overheating can be important under such static conditions, in particular on hot sunny days. The ventilating airflow occurs when the turbine engine is operating, irrespective of whether the aircraft is in motion, or not. Accordingly, the overheating risk is also considerably reduced under static conditions.

A further advantage is that the overheating risk is reduced without a substantial penalty in terms of increased weight. The covering structure on the opening can be relatively lightweight; the opening in the pylon does not add any weight. This is in contrast with prior-art solutions, which may involve a substantial penalty in terms of increased weight. For example, providing the bleed air duct with an ambient air duct, as proposed in the aforementioned prior-art document, may significantly increase weight.

A yet further advantage relates to the following aspects. As mentioned hereinbefore, it is possible to cool the compressed hot air that is taken from the turbine engine before applying this air to the bleed air duct. This cooling can be relatively strong so that the overheating risk is reduced, or even eliminated. However, such a strong cooling may prevent the compressed hot air that is bled off from satisfactorily fulfilling one or more functions. For example, the compressed hot air may be too cool to provide effective deicing. As another example, the compressed hot air may be too cool to efficiently provide air conditioning.

In an aircraft according to the invention, the ventilating airflow can effectively cool the aircraft parts that are relatively close to the bleed air duct, rather than cooling the compressed hot air. Accordingly, the overheating risk is prevented while the compressed hot air can have a temperature that is sufficiently high for satisfactorily fulfilling one or more functions.

Another aspect of the invention concerns a structural assembly for an aircraft as defined hereinbefore. The structural assembly comprises a pylon by means of which a turbine engine can be suspended from a wing, wherein the pylon comprises an opening with a covering structure projecting into a bypass exhaust flow from the turbine engine when mounted on the pylon and in operation, the covering structure leaving a slit facing away from the bypass exhaust flow, the pylon being arranged so that, when the pylon and the wing have been assembled, an airflow path extends from openings in the wing to the slit left by the covering structure.

Yet another aspect of the invention concerns a method of operating an aircraft as defined hereinbefore, the method comprising a step of activating the turbine engine so that the bypass exhaust flow flows along the covering structure thereby creating a suction effect in a vicinity of the slit left by the covering structure, the suction effect generating a ventilating air flow in the airflow path.

An embodiment of the invention advantageously comprises one or more of the following additional features, which are described in separate paragraphs. These additional features each contribute to advantageously implementing the solution in accordance with the invention, which reduces the overheating risk in a wide variety of conditions.

The airflow path advantageously surrounds the bleed air duct in the wing.

The covering structure advantageously comprises a flap inclined with respect to the opening in the pylon.

The flap is advantageously inclined at an angle comprised in a range from 10° to 15°.

The aircraft advantageously comprises a flap control module for controlling an angle of inclination of the flap with respect to the opening in the pylon.

The flap control module is advantageously adapted to control the angle of inclination in a range from 10° to 15°.

The opening in the pylon advantageously has a length comprised between 5 and 10 cm in a direction along the bypass exhaust flow.

The wing advantageously comprises a leading edge, the bleed air duct being at least partially located in the leading edge of the wing.

The leading edge of the wing advantageously comprises at least a portion of the openings from which the airflow path extends to the slit left by the covering structure.

The openings in the leading edge of the wing advantageously comprise slat track cut outs.

The openings in the leading edge of the wing advantageously comprise drain holes.

The leading edge of the wing advantageously comprises composite materials.

For the purpose of illustration of the invention summarized hereinbefore, as well as the additional features, a detailed description of particular embodiments is provided with reference to drawings.

DETAILED DESCRIPTION

Figure 1:
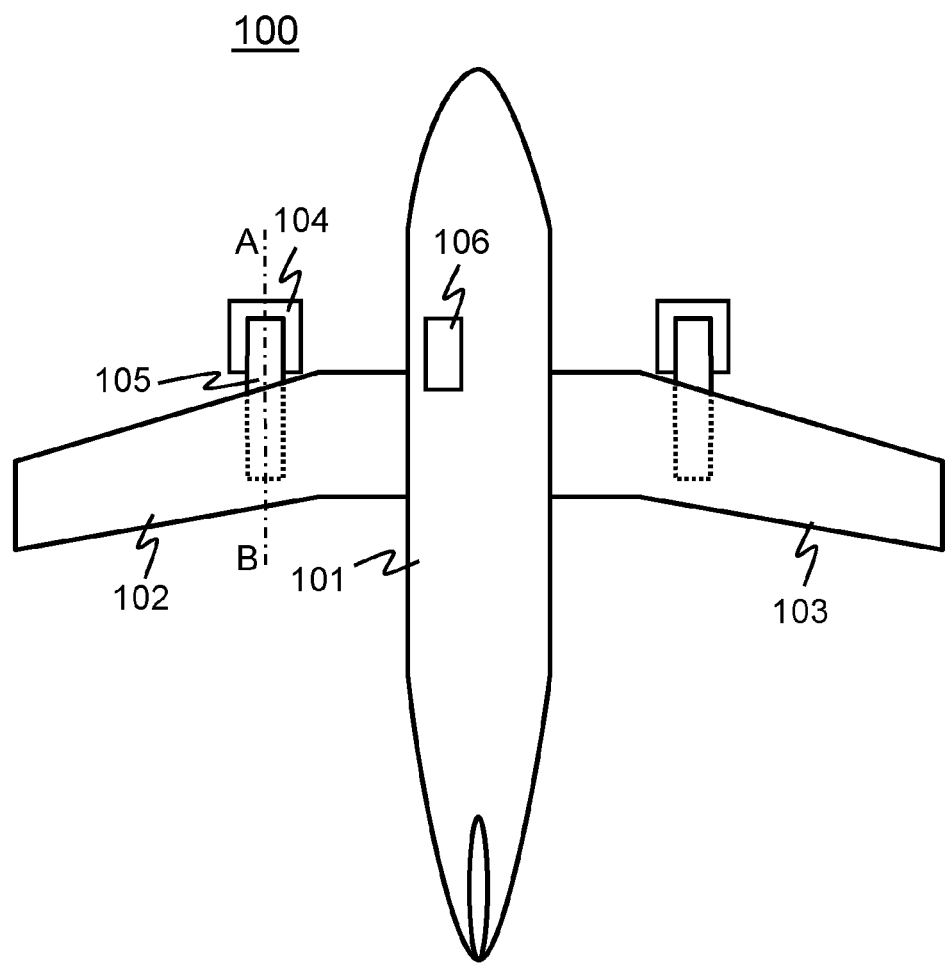
FIG. 1 is a pictorial diagram that illustrates a top view of an aircraft.

FIG. 1 schematically illustrates an aircraft 100 as seen from a top view. The aircraft 100 comprises a fuselage 101 and two main wings, one on each side of the fuselage 101, a left wing 102 and a right wing 103. The left wing 102 is provided with a turbine engine 104. The turbine engine 104 is suspended from the left wing 102 by means of a pylon 105. The same applies to the right wing 103. An environmental control system 106 is located within the fuselage 101. The environmental control system 106 provides an air conditioning function for one or more cabins within the aircraft 100. Moreover, the environmental control system 106 may pressurize these cabins at altitude during flight.

Figure 2:
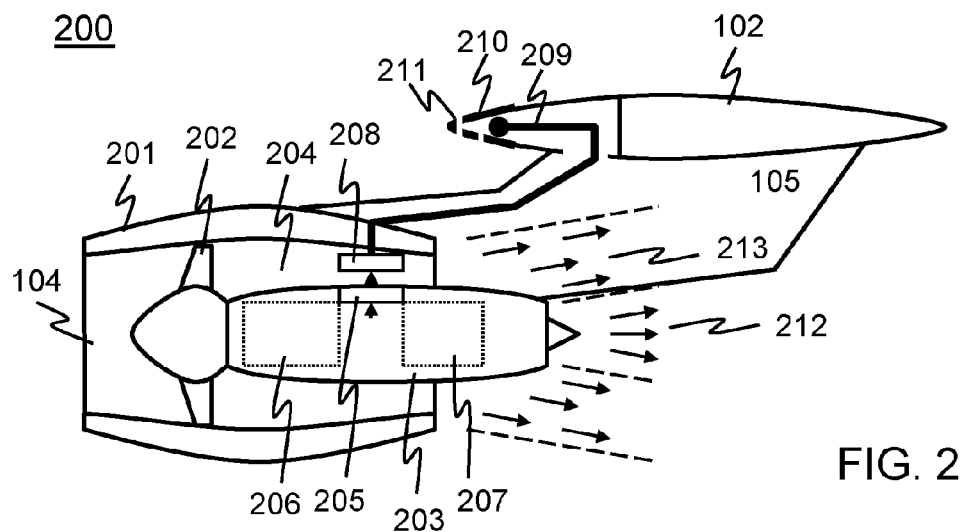
FIG. 2 is a schematic diagram that illustrates a cross-sectional view of the aircraft taken along a line that traverses a wing, a pylon, and a turbine engine of the aircraft.

FIG. 2 schematically illustrates a cross section of the aircraft 100 taken along a cut line A-B indicated in FIG. 1. The cut line A-B traverses the left wing 102, the pylon 105, and the turbine engine 104. FIG. 2 thus illustrates an assembly 200 comprising these elements. The left wing 102 will be referred to as the wing 102 hereinafter for reasons of convenience.

The turbine engine 104 comprises a nacelle 201. A fan 202 and an engine core 203 are located in the nacelle 201. A bypass duct 204 surrounds the engine core 203. The engine core 203 is provided with a bleed off-take arrangement 205 that has an inlet and outlet. The inlet is located between a compressor assembly 206 in the engine core 203 and a combustor 207. The outlet of the bleed off-take arrangement 205 is coupled to a cooling device 208, which may be located in the bypass duct 204. The bleed off-take arrangement 205 may comprise one or more ducts and one or more controllable valves. The cooling device 208 typically comprises a heat exchanger.

A bleed air duct 209 extends from the cooling device 208 in the turbine engine 104 to the environmental control system 106 in the fuselage 101. The bleed air duct 209 traverses the pylon 105 and the wing 102. More precisely, the wing 102 has a leading edge 210 in which at least a portion of the bleed air duct 209 is located. The leading edge 210 of the wing 102 is provided with openings 211. These openings 211 may comprise slat track cut outs or drain holes, or both. The leading edge 210 of the wing 102 may comprise composite materials and may even substantially be made of such materials. The same applies to the wing 102 as a whole.

In operation, the engine core 203 outputs a turbine exhaust flow 212. The bypass duct 204 outputs a bypass exhaust flow 213 when the turbine engine 104 is in operation. The engine core 203 internally produces compressed hot air, which is available at the inlet of the bleed off-take arrangement 205. A portion of this compressed hot air flows into the bleed off-take arrangement 205 and reaches the cooling device 208. The cooling device 208 cools the compressed hot air to a certain extent before the compressed hot air enters into the bleed air duct 209. This compressed hot air, which the bleed air duct 209 conveys towards the fuselage 101, is preferably sufficiently hot to ensure a satisfactory de-icing function and a satisfactory operation of the environmental control system 106.

Figure 3:
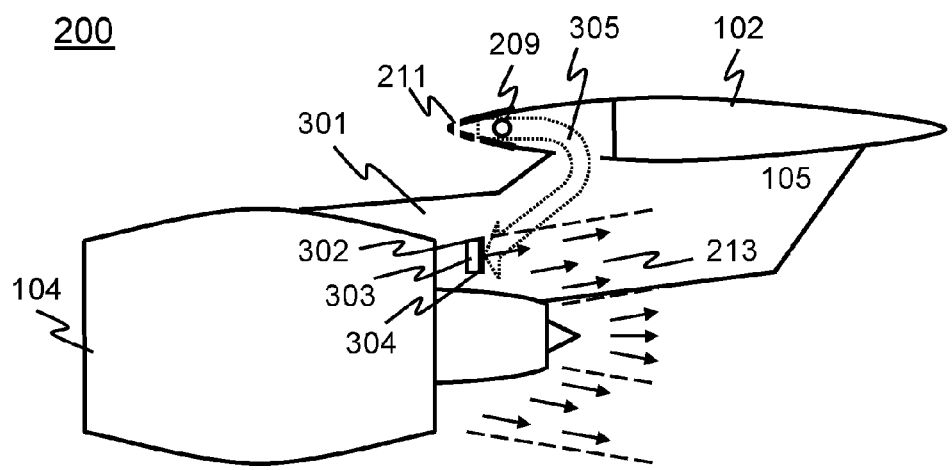
FIG. 3 is a schematic diagram that illustrates a side view of the wing, the pylon, and the turbine engine.

FIG. 3 schematically illustrates the assembly, which comprises the wing 102, the pylon 105, and the turbine engine 104, as a side view from a tip of the wing 102 directed towards the fuselage 101. In FIG. 3, it is seen that the pylon 105 has a fairing 301 that is exposed to the bypass exhaust flow 213. This fairing 301 is provided with an opening 302 and a covering structure in the form of a flap 303. The opening 302 and the flap 303 can jointly be designated as a flapped outlet 302-303. The flap 303, which forms the covering structure in this example, projects into the bypass exhaust flow 213. The flap leaves a slit 304 that faces away from the bypass exhaust flow 213. The pylon 105 and the wing 102 are arranged so that an airflow path 305 extends from openings 211 in the wing 102 to the slit 304 that is left by flap 303, which constitutes the covering structure in this example. The airflow path 305 surrounds the bleed air duct 209 in the wing 102.

In operation, the bypass exhaust flow 213 of the turbine engine 104 flows along the fairing 301 of the pylon 105 where the flapped outlet 302-303 is provided. This generates a reduced pressure in the vicinity of the slit 304 left by the flap 303. The reduced pressure in the vicinity of the slit 304 creates a suction effect, which draws air outwards from the pylon 105. As a result, a ventilating airflow occurs in the airflow path 305 that extends from the openings in the wing to the slit. Aircraft parts that are relatively close to the bleed air duct 209 are exposed to this ventilating airflow. The ventilating airflow thus provides a cooling effect for these aircraft parts. This considerably reduces a risk of overheating due to the bleed air duct 209 radiating and conflicting heat when conveying compressed hot air.

Figure 4:
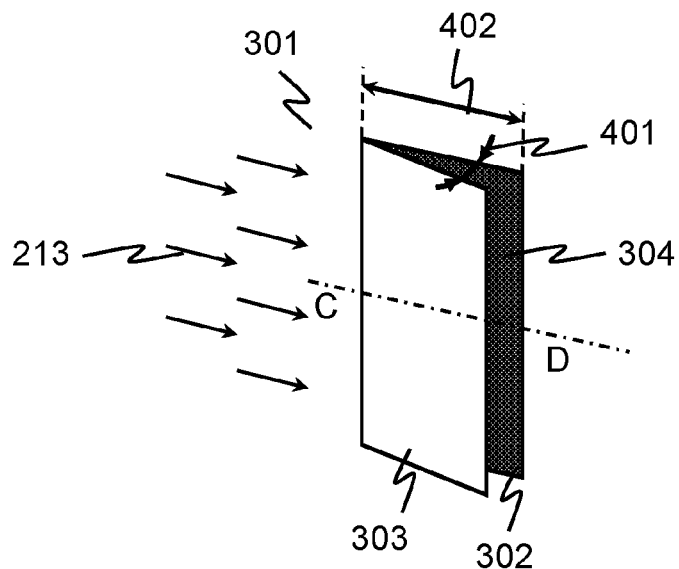
FIG. 4 is a pictorial diagram that illustrates a front view of a flap-covered opening in the pylon.

FIG. 4 schematically illustrates the flapped outlet 302-303 in the fairing 301 of the pylon 105 seen from a front view, which is slightly inclined. In fact, FIG. 4 is a zoomed-in, slightly inclined version of FIG. 3, with a zoom on the flapped outlet 302-303.

There are several design parameters for the flapped outlet 302-303, such as a size and an angle of inclination 401 of the flap 303 with respect to the fairing 301 of the pylon 105 that is exposed to the bypass exhaust flow 213. The size and the angle are preferably designed to achieve a satisfactory compromise between the two following points. On the one hand, the ventilating airstream, which results from the flapped outlet 302-303, should provide sufficient cooling under static conditions, such as, for example, when the aircraft 100 is queuing for takeoff. On the other hand, the flapped outlet 302-303 should not produce significant drag during flight.

For example, a satisfactory compromise may be found with the following values. The opening 302 may have a length 402 comprised between 5 and 10 cm in a direction along the bypass exhaust flow 213. The angle of inclination 401 of the flap 303 may be comprised between 10° and 15°.

Figure 5:
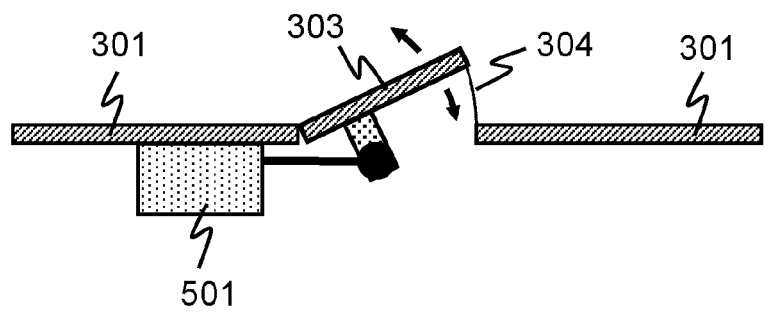
FIG. 5 is a schematic diagram that illustrates a cross-sectional view of a fairing of the pylon in which the flap-covered opening is located.

FIG. 5 schematically illustrates a cross-section of the flapped outlet 302-303 along a cut line C-D indicated in FIG. 4. FIG. 5 further illustrates that the flapped outlet 302-303 is preferably provided with a flap control module 501. The flap control module 501 allows controlling the angle of inclination 401 of the flap 303 with respect to the fairing 301 of the pylon 105 that is exposed to the exhaust bypass flow. The angle of inclination 401 may be controlled in a range extending from 10° to 15°. The flap control module 501 may also allow reducing the angle of inclination 401 during flight in order to reduce drag. The angle of inclination 401 during flight may be, for example, less than 10°. In an extreme case, the angle of inclination 401 may be reduced to 0° during flight if, for example, a ram air stream provides sufficient cooling of aircraft parts that are relatively close to the bleed air conduct.

Figure 6:
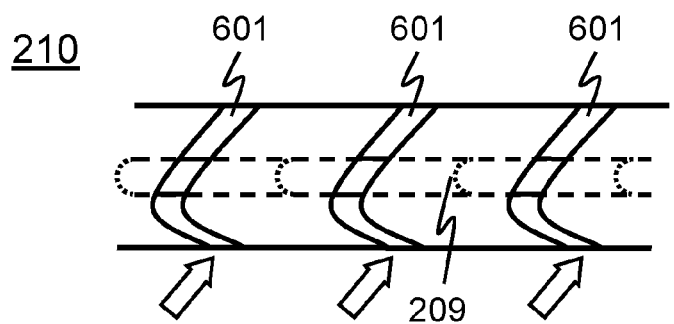
FIG. 6 is a pictorial diagram that illustrates a leading edge of the wing in which a bleed air duct is located.

FIG. 6 schematically illustrates the leading edge 210 of the wing 102. FIG. 6 further illustrates, in broken lines, a portion of the bleed air duct 209 that is located in the leading edge 210. The leading edge 210 is provided with slat track cut outs 601. The ventilating airflow, which reduces the risk of overheating, can at least partially enter the leading edge 210 of the wing 102 via these slat track cut outs 601. The ventilating airflow is drawn towards the slit 304 that is left by the flap 303, which constitutes the covering structure on the opening 302 in the pylon 105. As explained before, this is because a reduced pressure occurs in the vicinity of this slit 304 when the turbine engine 104 is in operation.

Final Remarks

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to aircrafts that use air bled off from a turbine engine. Although the description mentions that this air can be used for deicing and air conditioning, the bleed air can be used for a single function only. What matters is that the bleed air traverses a duct, which entails a risk of overheating parts that are relatively close to the duct.

There are numerous ways of bleeding off compressed hot air from a turbine engine and directing this air to a bleed air duct. For example, the bled off compressed hot air need not necessarily pass a particular cooling device before this air enters the bleed air duct, although this will generally be advantageous.

There are numerous ways of implementing a covering structure in accordance with the invention. A flap is merely an example of such a covering structure. As another example, the covering structure may comprise a raised tab or an arrangement in the form of a gill of a fish, or a series of such gills, which would have multiple slits. A covering structure may be stationary or adjustable. For example, the flap control module 501 illustrated in FIG. 5 is advantageous but not essential.

The term "aircraft" should be understood in a broad sense. The term may embrace any device that is capable of moving through the air.

In general, there are numerous different ways of implementing the invention, whereby different implementations may have different topologies. In any given topology, a single module may carry out several functions, or several modules may jointly carry out a single function. In this respect, the drawings are very diagrammatic. For example, referring to FIG. 5, the flap control module 501 may comprise several parts at different locations, such as, for example, a control part that is located in a cockpit. The same applies to other functional entities and modules that have been described.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. An aircraft comprising:
   a turbine engine provided with a bypass duct, which surrounds an engine core, the bypass duct outputting a bypass exhaust flow when the turbine engine is in operation;
   a bleed off-take arrangement for bleeding off compressed hot air from the turbine engine;
   a wing comprising a bleed air duct for conveying compressed hot air that has been bled off from the turbine engine towards a fuselage; and
   a pylon by means of which the turbine engine is suspended from the wing, the pylon comprising an opening with a covering structure projecting into the bypass exhaust flow and leaving a slit facing away from the bypass exhaust flow, the pylon and the wing being arranged so that an airflow path extends from openings in the wing to the slit left by the covering structure,
   wherein the air flow path provides airflow over at least a portion of the bleed air duct in the wing.

2. The aircraft according to claim 1, wherein the airflow path surrounds the bleed air duct in the wing.

3. The aircraft according to claim 1, wherein the covering structure comprises a flap inclined with respect to the opening in the pylon.

4. The aircraft according to claim 3, wherein the flap is inclined at an angle comprised in a range from 10° to 15°.

5. The aircraft according to claim 3, further comprising:
   a flap control module for controlling an angle of inclination of the flap with respect to the opening in the pylon.

6. The aircraft according to claim 5, wherein the flap control module is adapted to control the angle of inclination in a range from 10° to 15°.

7. The aircraft according to claim 1, wherein the opening in the pylon has a length comprised between 5 and 10 cm in a direction along the bypass exhaust flow.

8. The aircraft according to claim 1, wherein the wing comprises a leading edge, the bleed air duct being at least partially located in the leading edge of the wing.

9. The aircraft according to claim 8, wherein the leading edge of the wing comprises at least a portion of the openings from which the airflow path extends to the slit left by the covering structure.

10. The aircraft according to claim 9, wherein the openings in the leading edge of the wing comprise slat track cut outs.

11. The aircraft according to claim 9, wherein the openings in the leading edge of the wing comprise drain holes.

12. The aircraft according to claim 8, wherein the leading edge of the wing comprises composite materials.

13. A structural assembly for an aircraft, comprising:
   a pylon for suspending a turbine engine from a wing, the turbine engine comprising a bypass duct for outputting a bypass exhaust flow when the turbine engine is in operation, the pylon comprising:
   an opening, and
   a covering structure positioned over the opening and projecting into the bypass exhaust flow from the turbine engine, wherein the covering structure establishes a slit facing away from the bypass exhaust flow, a bleed air duct in the wing of the aircraft for providing compressed hot air from the turbine engine; and
   an airflow path defined between openings in the wing and the slit established by the covering structure, wherein the airflow path surrounds at least a portion of the bleed air duct in the wing.

14. The structural assembly according to claim 13, wherein the covering structure comprises a flap inclined with respect to the opening in the pylon.

15. The structural assembly according to claim 14, wherein the flap is inclined at an angle comprised in a range from 10° to 15°.

16. The structural assembly according to claim 14, further comprising:
   a flap control module for controlling an angle of inclination of the flap with respect to the opening in the pylon.

17. The structural assembly according to claim 16, wherein the flap control module is adapted to control the angle of inclination in a range from 10° to 15°.

18. The structural assembly according to claim 13, wherein the bleed air duct is at least partially located in a leading edge of the wing.

19. A method of operating an aircraft comprising a turbine engine provided with a bypass duct, which surrounds an engine core, the turbine engine being suspended from a wing of the aircraft by a pylon, the method comprising:
   outputting, via the bypass duct, a bypass exhaust flow when the turbine engine is in operation;
   bleeding off compressed hot air from the turbine engine via a bleed off-take arrangement;
   conveying, via a bleed air duct in the wing of the aircraft, compressed hot air bled off from the turbine engine;
   establishing an airflow path extending from openings in the wing to a slit established in a pylon by an opening with a covering structure projecting into the bypass exhaust flow, wherein the slit faces away from the bypass exhaust flow; and
   creating suction in a vicinity of the slit, the suction generating a ventilating air flow in the airflow path that flows over at least a portion of the bleed air duct.

20. A method for cooling bleed air from a turbine engine, the turbine engine suspended from a wing of an aircraft by a pylon, the method comprising:
   providing hot bleed-air from the turbine engine towards a fuselage of the aircraft via a bleed air duct in the wing of the aircraft; and
   establishing an airflow path between openings in the wing of the aircraft and a slit in the pylon of the aircraft, the slit being located in a bypass exhaust flow of the turbine engine and formed by a covering structure positioned over an opening in the pylon;
   wherein the airflow path provides airflow over at least a portion of the bleed air duct in the wing.

* * * * *